United States Patent [19]

Musch et al.

[11] Patent Number: 5,026,779
[45] Date of Patent: Jun. 25, 1991

[54] MIXTURES OF CHLOROPRENE POLYMERS

[75] Inventors: Rüdiger Musch, Bergisch Gladbach; Hans Magg, Kuerten; Werner Obrecht, Moers; Eberhard Müller, Dormagen, all of Fed. Rep. of Germany

[73] Assignee: Bayer Aktiengesellschaft, Leverkusen-Bayerwerk, Fed. Rep. of Germany

[21] Appl. No.: 462,005

[22] Filed: Jan. 8, 1990

Related U.S. Application Data

[63] Continuation-in-part of Ser. No. 723,381, Jul. 25, 1988, abandoned.

[30] Foreign Application Priority Data

Aug. 5, 1987 [DE] Fed. Rep. of Germany ....... 3725902
Jul. 25, 1988 [EP] European Pat. Off. ......... 88111933.3
Aug. 3, 1988 [CA] Canada ................................. 573676
Aug. 3, 1988 [JP] Japan ................................. 63-192869

[51] Int. Cl.$^5$ ............................................. C08L 11/00
[52] U.S. Cl. ..................................... 525/215; 525/237
[58] Field of Search ......................... 525/215, 236, 237

[56] References Cited

U.S. PATENT DOCUMENTS

| | | | |
|---|---|---|---|
| 3,876,732 | 4/1975 | Kitagawa et al. | 525/215 |
| 3,937,659 | 2/1976 | Boldt | 525/215 |
| 4,000,222 | 12/1976 | Mayer-Maden et al. | 525/215 |
| 4,035,446 | 7/1977 | Hoff, Jr. | 525/215 |
| 4,482,676 | 11/1984 | Musch et al. | 525/215 |
| 4,485,216 | 11/1984 | Musch et al. | 525/215 |
| 4,769,407 | 9/1988 | Obrecht et al. | 24/108 |

FOREIGN PATENT DOCUMENTS

| | | | |
|---|---|---|---|
| 651766 | 11/1962 | Canada | 525/215 |
| 2220542 | 10/1974 | France . | |
| 2523223 | 3/1984 | France . | |
| 59-56440 | 3/1984 | Japan . | |
| 2108974 | 5/1983 | United Kingdom | 525/215 |

*Primary Examiner*—Allan M. Lieberman
*Attorney, Agent, or Firm*—Connolly & Hutz

[57] ABSTRACT

This invention relates to mixtures of polychloroprene elastomers which are distinguished by their good processibility and excellent cold resistance.

5 Claims, No Drawings

MIXTURES OF CHLOROPRENE POLYMERS

This application is a continuation-in-part application of parent application Ser. No. 223,381, filed July 25, 1988, now abandoned.

This invention relates to mixtures of polychloroprene elastomers which are distinguished by their good processability and excellent cold resistance. By "good processibility" is meant, for example, the dimensional stability and excellent surface smoothness of extrudates.

One possibility of producing polychloroprene elastomers with advantageous processing properties consists of adding the latex of a cross-linked (toluene-insoluble) polychloroprene (gel polymer) to a latex of a toluene-soluble polychloroprene (sol polymer) and isolating the rubber, for example by freeze coagulation.

The addition of such gel polymer to a sol polymer hitherto had the disadvantage of impairing the resistance of the vulcanizates to low temperatures.

To satisfy the increasing standards demanded of polychloroprene vulcanizates intended for outdoor use under prolonged periods of low temperatures, it is necessary to reduce the tendency to crystallization beyond what has hitherto been obtainable.

It is an object of the present invention to improve the cold resistance of chloroprene rubbers beyond the hitherto attainable measure while preserving the other advantageous properties.

It has now been found that the advantageous processing properties of the sol-gel mixtures are preserved and the resistance to crystallization of the mixtures and vulcanizates at the same time substantially improved if the two lattices required for the mixtures are prepared by the polymerisation of chloroprene in the presence of different comonomers and care is taken to ensure that in the case of the polymer containing the gel the cross-linking density of the gel is not below a certain limit.

The comonomers used for the preparation of the sol polymer may be halogenated or alkyl substituted butadienes, styrene, acrylic acid esters or 1-chlorobutadiene, 2,3-dichlorobutadiene and 1-chlorobutadiene being particularly preferred.

The preferred starting monomers may be used in the following quantities:

chloroprene: 82–98, preferably 88–96 parts by weight, 2,3-dichlorobutadiene: 1–12, preferably 3–8 parts by weight, 1-chlorobutadiene: 0.1–6, preferably 1–4 parts by weight.

From 50 to 99% of the monomers are reacted, depending on the envisaged use of the polymer, the conversion being preferably from 60 to 80% in the case of solid rubbers for obtaining advantageous properties for technical application.

The structure and the properties of the polymers may be varied within wide limits by the addition of compounds known to act as regulators, e.g. mercaptans.

In a preferred embodiments, particularly when polymers free from gel are to be produced, the regulator is added at the beginning of polymerisation and then stepwise in the course of polymerisation.

Aliphatic mercaptans are preferred chain transfer agents, especially those with 8 to 18 carbon atoms. The mercaptans may be straight chained or branched and may be primary, secondary or tertiary mercaptans but the most preferred mercaptan is n-dodecyl mercaptan. Other known chain transfer agents may also be used, e.g. aromatic disulphides or alkylxanthogen disulphides containing 1 to 12 carbon atoms in the alkyl group or xanthogen disulphides containing heterocyclic rings instead of the alkyl group, such as bis-)5-ethyl-1,3-dioxan-5-yl-methyl)-xanthogen disulphide.

Unreacted organic compounds may be removed by steam distillation (stripping) after the reaction, for example at 50° C. and under an absolute pressure of 20 torr.

The polymerisation experiments described in the following examples were carried out for obtaining specific reaction conditions in a continuously operated 6-tank cascade.

This continuous polymerisation of chloroprene has been disclosed in U.S. Pat. Nos. 2,384,277, 2,394,291 and 2,831,842.

The monomer including the stabilizer and regulator was pre-emulsified in the aqueous phase containing the emulsifier and caustic soda and was then introduced into the reaction vessel into which the initiator was dosed at the same time. The process may, however, also be carried out without pre-emulsification.

After discharge of the reaction mixture from the cascade of stirrer vessels, the reaction was terminated by the addition of diethylhydroxylamine and removal of the monomer.

Various methods may be used for the preparation of the gel polymer, for example those described in DE-AS 12 29 716, U.S. Pat. No. 3,147,318, DE-AS 12 48 921, DE-AS 12 71 990, DE-OS 15 70 089, DE-OS 17 95 187, DE-OS 17 70 651, DE-OS 20 08 673 and DE-OS 17 20 107.

The gel polymer is preferably prepared by the copolymerisation of chloroprene, a bifunctional monomer such as a diester of dihydric alcohols and acrylic acids and optionally also other monomers of the type already described for the preparation of the sol polymer.

Particularly preferred diesters are those corresponding to the formula

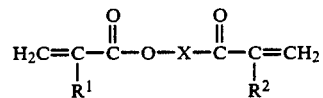

wherein
R¹ and R² denote, independently of one another, hydrogen or $C_1$ to $C_4$ alkyl, and
X denotes

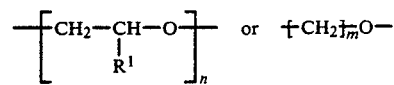

in which $1 \leq n \leq 10$ and $2 \leq m \leq 10$.

The diester is preferably used in a quantity of 2 to 3 mol %. Ethylene glycol dimethacrylate is the preferred diester.

2,3-dichlorobutadiene and 1-chlorobutadiene are particularly preferred comonomers which do not undergo cross-linking under the usual conditions. These comonomers may be present at the onset of polymerisation at a concentration of up to 10 parts by weight (2,3-dichlorobutadiene) and 0 to 4 parts by weight (1-chlorobutadiene), based on 100 parts of monomer.

Polymerisation and isolation of this latex are carried out as for the preparation of the sol latex and it is an essential feature of the invention to produce a gel polymer which has a certain minimum density of cross-linking. One measure for determining the cross-linking density is the swelling index.

This index is determined by adding toluene to the polymer in a breaker (B) so that the ratio by weight of polymer to toluene is 1:250 and dissolving the polymer therein over a period of 24 hours at room temperature with stirring. The insoluble residue is then centrifuged for 60 minutes at 25,000 revs per min, the supernatant solution is decanted and the insoluble, moist polymer is weighed together with the beaker (BGF).

The moist polymer is then dried to constant weight in the beaker at 60° C. under a vacuum and the weight is again determined (BGT). The swelling index (Q) is then determined from the resulting data according to the following formula:

$$\frac{BGF - BGT}{BGT - B} = Q$$

In the mixture of polychloroprene elastomers according to the invention, the swelling index of the gel component should generally be $\leq 12$ and is preferably 5–10.

Generally, the pH of the alkaline latex mixtures may be lowered to pH 6.5 with dilute acetic acid and the polymer may be isolated from this emulsion by freeze coagulation and dried (Chem. Eng. Prog. 43, (1974); DE-OS 1,051,506).

In this known process, the latex coagulates on a cooled roller which rotates in the latex. The rubber sheet which forms on the surface of the roller and which contains ice is lifted off and passed over a washing belt where the ice thaws. The wet sheet is then passed between squeezing rollers to be partially dewatered and enters a shelf drier at a water content of about 30% be weight. In this drier, the band of polymer is conducted over several deflecting rollers to pass over several shelves arranged above one another where it is dried with hot air. The sheet then leaves the drier and is formed into a strand which is cut up into pieces as required.

This invention thus relates to solid polychloroprene mixtures of (i) 20 to 90% by weight of sol polymer and
(ii) 80 to 10% weight of gel polymer, these percentages being based on the mixtures (i)+(ii), characterised in that the sol component (i) consists of a copolymer of (a) 82 to 97% by weight of chloroprene,
(b) 3 to 12% by weight of 2,3-dichlorobutadiene, and
(c) 0 to 6% by weight of other (non-crosslinking) monomer, these percentages being based on sol (i), and the gel component (ii) consists of a copolymer of (d) 86 to 97% by weight of chloroprene,
(e) 3 to 10% by weight of 2,3-dichlorobutadiene and
(f) 0 to 4% by weight of other non-crosslinking monomer, these percentages being based on the sum of non-crosslinking monomers of (ii), and from $7.5 \times 10^{-3}$ to $4.0 \times 10^{-2}$ mol, based on 100 g of the total quantity of monomer in the gel polychloroprene, of a compound corresponding to the following general formula

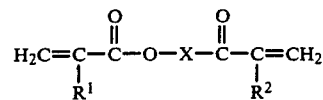

in which
$R^1$ and $R^2$ denote, independently of one another, hydrogen or $C_1$ to $C_4$ alkyl, and
X denotes

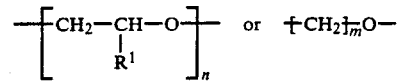

n denotes a number from 1 to 10 and
m denotes a number from 2 to 10
with the proviso, that the sum ob (b) and (e) amounts to 8 to 20, preferably 9,5 to 16% by weight, based on the total polychloroprene (i)+(ii).

1- Chlorobutadiene may be used as additional comonomers both for the sol polymers and for the gel polymers.

Preparation of the solid polychloroprene mixture is preferably carried out by mixing the components which are in latex form, optionally together with substances which improve the storage stability of the polymer, and then coagulating.

The crystallization half life value is determined by the method described by M. Hoffmann, using a dilatometer at a temperature of $-10°$ C. (Makromol. Chem. 126, (1969), pages 186 to 203).

Under the conditions of measurement described in the above reference, a rubber mixture according to the invention which has the gel content of 40% generally has a crystallization half life value above 50 h, preferably above 70 h, in particular above 100 h. The crystallization half life values of mixtures with other gel contents vary correspondingly.

The gel polymer should generally have a swelling index in toluene of $<12$, preferably 5 to 10, after it has been worked up into the solid rubber. The invention will now be illustrated with the aid of examples.

Examples 1 to 3 describe the preparation of the sol components and Examples 4 to 7 the preparation of the gel components. Examples 14 to 16 described mixtures according to the invention.

EXAMPLES 1

Sol Polymer

The aqueous phase (W) and the monomer phase (M) were introduced in constant proportions using a measuring and control apparatus, into the first reactor of a polymerisation cascade consisting of 6 equal reactors each having a volume of 50 liters. The average residence time in each reactor was 30 minutes. The activator phase A was introduced into the second reactor (first polymerisation tank). The figures given are parts by weight per unit time. The actual quantities depend on the formulation, the densities of the individual phases, the volume to which the reactor was filled and the average residence time.

| Monomer phase M | |
|---|---|
| Chloroprene | 100.0 |
| n-dodecyl mercaptan | 0.22 |

| Aqueous Phase W | |
|---|---|
| Deionized water | 130.0 |
| Sodium salt of a disproportionated abietic acid | 4.5 |
| Sodium salt of a condensation product of naphthalene sulphonic acid and formaldehyde | 0.7 |
| Caustic soda | 0.65 |
| Activator Phase A | |
| 3% by weight aqueous formamidine sulphinic acid solution (continuous inflow) | 0.30 |

The reaction started in the first polymerisation tank at a reaction temperature of 48° C. The heat of polymerisation was removed by external cooling and the polymerisation temperature was lowered to 45° C. The reaction mixture passes through the cascade of stirrer vessels at a rate adjusted to the rate of inflow into the first vessel. When 66% of the monomer has been converted, the reaction was stopped by the addition of diethylhydroxylamine. The remaining monomer was removed from the polymer by steam distillation and the polymer latex was stored at 10° C.

EXAMPLES 2 AND 3

Sol Polymer, Altered Monomer Phase

The procedure is the same as in Example 1 but with different monomer phases.

| Monomer Phase M: | | |
|---|---|---|
| Example | 2 | 3 |
| Chloroprene | 96.0 | 92.0 |
| 2,3-dichlorobutadiene (DCB) | 4.0 | 8.0 |
| n-dodecyl mercaptan | 0.22 | 0.22 |

EXAMPLE 4

Gel Polymer

The procedure is as in Example 1, using the following quantities:

| Monomer Phase M: | |
|---|---|
| Chloroprene | 96.0 g |
| Ethylene glycol dimethacrylate (EGDM) | 4.0 g |
| n-dodecyl mercaptan | 0.3 g |
| Aqueous Phase W: | |
| Deionized water | 130.0 g |
| Sodium salt of disproportionated abietic acid | 3.5 g |
| Sodium salt of condensation product of naphthalene sulphonic acid and formaldehyde | 0.7 g |
| Caustic soda | 0.4 g |
| Activator Phase A: | |
| 3% aqueous formamidine sulphinic acid solution (continuous inflow) | 0.41 |

The reaction is stopped at a monomer conversion of 80% by the addition of diethylhydroxylamine. The remaining monomer is removed from the polymer by steam distillation. The polymer latex is stored at 10° C.

EXAMPLES 5 TO 7

Gel polymer, a Different Monomer Phase

The procedure is the same as in Example 4 but using a monomer phase having the following composition:

| Example | 5 | 6 | 7 |
|---|---|---|---|
| Chloroprene | 95.0 | 91.0 | 87.0 |
| EGDM | 5.0 | 5.0 | 5.0 |
| DCB | 0 | 4.0 | 8.0 |
| n-dodecyl mercaptan | 0.2 | 0.2 | 0.2 |

EXAMPLES 8 TO 18

The lattices of the gel polymers were mixed at room temperature with stirring and the rubber was isolated by freeze coagulation. The two components of the mixture were added in such proportions that the rubber contained 40±1% by weight gel. The relevant data are summarized in the following table.

| | Components of Mixture | | Raw Material | | Vulcanizate | |
| | | | Swelling | Crystallization | Compression set (CS) | |
| | Sol Polymer | Gel Polymer | Index | of raw | | |
| Example | from Example | from Example | (%) | material(h) | 0° C. % | −10° C. % |
|---|---|---|---|---|---|---|
| 8 | 1 | 4 | 15 | 13 | 91 | 99 |
| 9 | 2 | 4 | 16 | 28 | 78 | 91 |
| 10 | 3 | 4 | 18 | 80 | 33 | 65 |
| 11 | 1 | 5 | 7 | 9 | 84 | 96 |
| 12 | 1 | 7 | 8 | 15 | 85 | 92 |
| 13 | 2 | 5 | 8 | 21 | 88 | 96 |
| 14 | 2 | 7 | 8 | 90 | 26 | 55 |
| 15 | 3 | 7 | 9 | 290 | 21 | 32 |
| 16 | 3 | 6 | 9 | 150 | 21 | 33 |
| 17 | 1 | — | — | 8 | 99 | 100 |
| 18 | 2 | — | — | 325 | 17 | 27 |

Examples 14 to 16 are according to the invention
Examples 8 to 13 and 17 to 18 represent comparison experiments.

Determination of crystallization:
This was carried out as described in DIN 53 541.
Determination of the surface properties:
The superior surface properties of the polymers according to the invention is confirmed by a test which resembles conditions encountered in practice. The following substances were first mixed in a laboratory kneader for 4 minutes:

| Polymer (Examples 8 to 18) | 1,000 g |
|---|---|
| Carbon black N-990 | 250 g |
| Carbon black N-539 | 250 g |
| Aromatic mineral oil | 150 g |
| Phenyl-β-naphthylamine | 20 g |
| Magnesium oxide | 40 g |
| Wax protecting against ozone | 10 g |

-continued

| Stearic acid | 10 g |

The mixtures were then compounded for 3 minutes on a roller at 30° C.

After a storage time of about 24 hours at room temperature, the mixtures were extruded in a Brabender Plastograph.

| Extrusion Conditions: | |
|---|---|
| Apparatus | 10-D Double Screw, $\phi$ 19 mm Normal |
| Extrusion profile | Garvey |
| Speed of rotation of screw | 40 min$^{-1}$ |
| Temperature at entrance | 50° C. |
| Cylinder temperature | 70° C. |
| Head temperature | 4.35 mm |
| Nozzle inlet | 75° |
| Quantity of mixture | 200 g |

EXAMINATION OF VULCANIZATE

Preparation of the mixtures, vulcanization and examination of the vulcanizate were carried out in accordance with ISO Regulation 2475-1957 (E).

Before the mixture was prepared, 1000 g of polychloroprene were masticated for 6 minutes using a roller gap adjusted to produce a bead with a diameter of about 12 mm. After mastication, 800 g of rubber are removed and stored at room temperature for at lest 10 minutes and at most 120 minutes.

| Roller mill | 200 × 390 mm |
|---|---|
| Temperature | 45-55° C. |
| Friction | 1:1.4 (24:34 revs per min). |

Before mixing is begun, the roll mill which is adjusted to a temperature of 30° C. is heated to the above mentioned lower limit of the operating temperature by means of rubber waste.

| Test Mixture. Components of Mixture | |
|---|---|
| Polychloroprene | 100.00 g |
| Stearic acid | 0.50 g |
| Magnesium oxide | 4.00 g |
| Phenyl-$\beta$-naphthylamine | 2.00 g |
| Carbon black N-762 | 30.00 g |
| Zinc oxide | 5.00 g |
| Ethylene thiourea | 0.50 g |
| | 142.00 g |

The mixing sequence and times conform to the data given. After a mixing time of 13 minutes, incisions are made in the rolled sheet on alternate sides (3 times on the left and 3 times on the right) for one minute while the sheet is worked and the sheet is then drawn 6 times through a roller nip of 0.8 mm within a further 2 minutes so that the total mixing time is 16 min.

The mixture is then stored for 15 hours until vulcanisation is carried out.
Vulcanization conditions:
Temperature: = 150° C.
Time: = 40 min.

The compression set is determined according to DIN 53 517 at 0 and −10° C.

The test procedure according to this standard serves to determine the behavior of elastomers at low temperatures under constant pressure deformation.

The compression set CS under constant deformation shows what proportion of deformation of a sample body has remained at a given moment in time after the release of pressure, based on the compression.

The CS is calculated in % in accordance with the following equation:

$$CS = \frac{h_o - h_2}{h_o - h_1} \cdot 100$$

in which
$h_0$ denotes original height of sample,
$h_1$ denotes height of sample in the deformed state and
$h_2$ denotes the height of the sample after release of pressure for a given duration.

The polymers prepared according to the invention (Examples 14 to 16) show more favourable surface properties of the extrudates when compared with sol and sol-gel mixtures of the comparison examples and excellent low temperature properties of the vulcanizates.

We claim:
1. Polychloroprene mixtures of
   (i) 20 to 90% by weight of sol polymer and
   (ii) 80 to 10% by weight of gel polymer, these percentages being based on the mixtures (i)+(ii), characterised in that the sol component (i) consists of a copolymer of
   (a) 82 to 97% by weight of chloroprene,
   (b) 3 to 12% by weight of 2.3-dichlorobutadiene, and
   (c) 0 to 6% by weight of other non-crosslinking monomer, these percentages being based on sol (i), and the gel component (ii) consists of a copolymer of
   (d) 86 to 97% by weight of chloroprene,
   (e) 3 to 10% by weight of 2.3-dichlorobutadiene and
   (f) 0 to 4% by weight of other non-crosslinking monomer, these percentages being based on the sum of non-crosslinking monomers of (ii), and
from $7.5 \times 10^{-3}$ to $4.0 \times 10^{-2}$ mol, based on 100 g of the total quantity of monomer in the gel polychloroprene, of a compound corresponding to the formula

$$H_2C=C-\overset{O}{\underset{R^1}{\overset{\|}{C}}}-O-X-\overset{O}{\underset{R^2}{\overset{\|}{C}}}-C=CH_2$$

wherein
R$^1$ and R$^2$ denote, independently of one another, hydrogen or C$_1$ to C$_4$ alkyl, and
X denotes $$\left[ \begin{array}{c} CH_2-CH-O \\ | \\ R^1 \end{array} \right]_n \quad \text{or} \quad +CH_2\}_m O-$$

n denotes a number from 1 to 10 and
m denotes a number from 2 to 10
with the proviso, that the sum of (b) and (e) amounts to 8 to 20% by weight, based on the total polychloroprene (i)+(ii).

2. Polychloroprene mixtures according to claim 1 in which $R^1$ and $R^2$ denote methyl and X denotes $CH_2$—$CH_2$—O.

3. Polychloroprene mixtures according to claim 1 in which the comonomer (c) and/or (f) is 1-chloroprene.

4. Polychloroprene mixtures according to claim 1, characterised in that the gel polymer has a swelling index in toluene of at most 12.

5. Polychloroprene mixtures according to claim 1, characterised in that the raw material has a crystallization half life value at $-10°$ C. of at least 50 hours at a gel content of 40%.

* * * * *